(12) United States Patent
Hoffmann et al.

(10) Patent No.: US 7,050,584 B1
(45) Date of Patent: May 23, 2006

(54) METHOD AND SYSTEM FOR REGENERATING A PRIVATE KEY FOR A PREDETERMINED ASYMMETRIC CRYPTOGRAPHIC KEY PAIR

(75) Inventors: Gerhard Hoffmann, München (DE); Klaus Lukas, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/763,271

(22) PCT Filed: Aug. 4, 1999

(86) PCT No.: PCT/DE99/02443

§ 371 (c)(1),
(2), (4) Date: Feb. 20, 2001

(87) PCT Pub. No.: WO00/11833

PCT Pub. Date: Mar. 2, 2000

(30) Foreign Application Priority Data

Aug. 18, 1998 (DE) .................. 198 37 405

(51) Int. Cl.
H04L 9/00 (2006.01)
(52) U.S. Cl. .................. 380/44; 380/46; 380/262
(58) Field of Classification Search ........... 380/44–47, 380/262
See application file for complete search history.

(56) References Cited

U.S. PATENT DOCUMENTS 5,201,000 A * 4/1993 Matyas et al. ............... 380/30

FOREIGN PATENT DOCUMENTS

| DE | 42 43 908 | 6/1994 |
|---|---|---|
| EP | 0 534 420 | 3/1993 |
| WO | WO 99/33219 | 7/1999 |

OTHER PUBLICATIONS

Menezes et al. (Alfred J. Menezes, Paul C. van Oorschot, Scott A. Vanstone, "Handbook of applied cryptography", 1997, ISBM: 0849385237).*
Knuth (Donald E. Knuth, The art of computer programming, 3rd edition, vol. 1, 1997, ISBN: 0201896834), p. 147.*
Flanagan (D. Flanagan, "Java in a nutshell", 3rd Edition, 1999, ISBN: 1565924878), p. 52.*
Schneier (Bruce Schneier, "Applied Cryptography, Protocols, Algorithms and Source Code in C", 2nd edition, 1996 ISBN: 0471128457), p. 467.*
Christoph Ruland: "Informationssicherheit in Datennetzen", (1993) Datacom, XP000863430, pp. 79-85.

(Continued)

Primary Examiner—Gregory Morse
(74) Attorney, Agent, or Firm—Staas & Halsey LLP

(57) ABSTRACT

After a key pair with a public key and a corresponding private key has been determined on the basis of an initial value, the initial value is made available to a user. The private key can then be erased. When the user wishes to carry out a cryptographic operation based on the "Public-Key-Technology", the user enters the initial value into a computer and, upon utilization of the initial value, a regenerated private key is formed, which corresponds to the private key that had been previously formed but was then erased.

13 Claims, 3 Drawing Sheets

OTHER PUBLICATIONS

Christoph Ruland: "Informationssicherheit in Datennetzen", (1993) Datacom, XP000863429, pp. 68-73.
D. Longley et al., "Data & Computer Security" Dictionary of standard, concepts and terms, (1987), pp. 316-317.
A.J. Menezes, et al., Handbook of Applied Cryptography, CRC Press, Chapter 4, (1996), pp. 138-140.
Patent Abstracts of Japan: Publication No. 03082237, dated Apr. 8, 1991.

* cited by examiner

METHOD AND SYSTEM FOR REGENERATING A PRIVATE KEY FOR A PREDETERMINED ASYMMETRIC CRYPTOGRAPHIC KEY PAIR

BACKGROUND OF THE INVENTION

1. Field of the Invention

The invention relates to a method and an arrangement for forming a secret communication key for a predetermined asymmetric key pair.

2. Description of the Related Art

The formation of an asymmetric cryptographic key pair is known from C. Ruland, Informationssicherheit in Datennetzen, ISBN 3-89238-081-3, DATACOM-Verlag, page 79–85, 1993 (Ruland I), which discloses the RSA method for forming a cryptographic key pair, which comprises a secret (private) key and a corresponding public key. Only the user knows the private key, but the public key can be made known to all subscribers of a communication network. In this method, the user signs the data with his private key when a digital signature is prepared for protecting the authenticity and integrity of electronic data. The signed digital signature is verified upon utilization of the public key corresponding to the private key, so that the authenticity or integrity of the digital signature can be checked by all communication partners, who have access to the public key. The previously mentioned "Public-Key-Technology" is particularly applied in the digital communication within a computer network (a fixed number of computer units, which are connected to one another via a communication network). Given the method known from Ruland, the protection of the private key against unauthorized access of a third party is of critical importance for the security of the digital signature.

It is known from D. Longley and M. Shain, Data & Computer Security, Dictionary of standards concepts and terms, Stockton Press, ISBN 0-333-42935-4, page 317, 1987 (Longley) to store the private key on an external medium for storing data, for example, a chip card, a disk etc., or on a hard disk, where key data are protected in that a personal identification code (Personal Identification Number, PIN) or a password, with which the key data that are respectively deciphered is used. It is necessary, however, to access the local resources of a user when these external media are used. This is not desired especially with respect to a network-oriented infrastructure of network computers or Java applications. These are defined as follows. A network computer is a computer that is networked with other computers; and a Java application is a program containing programs that are written in the programming language Java. The method known from Longley is disadvantageous in that the private key must be stored on an external medium, so that it is very difficult to protect the private key against misuse.

An overview regarding hash functions can be found in C. Ruland, Informationssicherheit in Datennetzen, ISBN 3-89238-081-3, DATACOM-Verlag, page 68–73, 1993 (Ruland II). A hash function is a function in which it is possible to calculate a corresponding input value to a given function value. Furthermore, an output character string having a fixed length is allocated to an arbitrarily long input character string. Moreover, additional properties can be requested for the hash function, such as collision freedom, which precludes the possibility of finding two different input character strings resulting in the same output character string. Examples of a hash function are the method according to the MD-2 standard, the method according to the MD-5 standard, the Data Encryption Standard (DES), which is carried out without utilizing a key, or any other arbitrary hash function.

A method referred to as a "Miller-Rabin" can determine whether a number is prime or not. Such a method is known from A. J. Menezes, P. van Oorschot and S. Vanstone, Handbook of Applied Cryptography, CRC Press, ISBN 0-8493-8523-7, page 138–140, 1997 (Menezes).

SUMMARY OF THE INVENTION

An object of the invention is to form a secret communication key for a predetermined asymmetric cryptographic key pair, where the private key of the asymmetric key pair must not be stored permanently.

The problem is solved by a method for forming a secret communication key for a predetermined asymmetric cryptographic key pair which comprises a private key and a corresponding public key, by a computer, comprising the steps of utilizing a prescribable initial value given a determination of the key pair; providing the initial value to a user; entering, by the user, the initial value into the computer; and forming the secret communication key upon utilization of the initial value, the secret communication key and the public key forming an asymmetric cryptographic communication key pair.

The problem is also solved by an arrangement comprising an input device configured for entering an initial value by a user; and a processor connected to the input device, the processor configured to implement the above method.

Given the method for forming a secret communication key for a predetermined asymmetric cryptographic key pair, which comprises a private key and a corresponding public key, a prescribable initial value (that is available to a user) is used with respect to the determination of the key pair. The user enters the initial value into the computer and the secret communication key is formed upon utilization of the initial value. The secret communication key and the public key form a communication key pair, which is not to be confused with the predetermined asymmetric cryptographic key pair.

The arrangement for forming a secret communication key for a predetermined asymmetric cryptographic key pair, which comprises a private key and a corresponding public key, has a processor, which is set up such that the following steps can be carried out:

a prescribed initial value is used for determining the key pair, the user enters the initial value into the computer, the secret communication key is formed upon utilization of the initial value, where the secret communication key and the public key form a communication key pair.

Furthermore, an input device is provided for entering the initial value by the user.

As a result of the invention, it is possible to erase the private key without having to forego the intense cryptography of the "Public-Key-Technology". Concretely, the initial value can be regarded as a personal identification code (Personal Identification Number—PIN) or as a password that is prescribed by the user or that is centrally prescribed and that is entered by the user into the computer. After the password or the PIN has been entered, the secret communication key, i.e., the key that is of the same name compared to the private key, is formed, which forms a communication key pair together with the public key (i.e., the communication key pair comprises the public key and the secret communication key), upon utilization of the password or of the PIN as an initial value.

In this way, a fusion of the password technology customary to the user of a conventional computer network or of a conventional computer with the intense cryptology is inventively achieved without considerable efforts being necessary in order to permanently store private key material.

Preferred embodiments of the method and associated apparatus for implementing the method are provided as follows. The inventive method may further is comprise the steps of: supplying the initial value to a hash function; and determining, using a hash function value formed by the hash function, the key pair and the communication key pair. The formation of the communication key pair may further include additional data characterizing the user. The method may further comprise the steps of: determining a prime number based on the initial value, where, in an iterative method, the following steps are performed: 1) checking the initial value or a previously checked number, producing a checked number, to determine whether the checked number is a prime number and (determination of primacy), and if the checked number is a prime, storing an index, which refers to a plurality of numbers, which have been checked with respect to their property of being prime; and 2) selecting, when the number is not a prime number, another number based on the checked number and the index, the checked number being increased by a prescribed number; where the method further comprises the steps of: erasing a used prime number after the communication key pair has been formed; and forming, with the index and the initial value, a new communication key pair for forming the secret communication key.

The inventive methods and associated apparatus are described in more detail below.

In an embodiment of the invention, a hash function is applied to the initial value, providing a value being formed that is finally used for the key generation. Furthermore, additional data, which preferably characterize the user himself, can be used during the key generation. The RSA method for the key generation is preferably used for forming the cryptographic key. The method according to the MD-5 standard, the MD-2 standard or the Data Encryption Standard (DES) can be used as a hash function. The communication key pair can be used for enciphering or for securing the integrity of electronic data, for forming a digital signature via electronic data or for authenticating a user—generally for any arbitrary cryptographic operation using the "Public-Key-Technology" that uses the formed communication key pair.

For accelerating the method, it is advantageous in an embodiment to store an index (accelerating code) when the private key is formed. The accelerating code indicates how often numbers—proceeding from the initial value—have been checked to the effect whether or not the respective number is a prime number. The method according to Miller-Rabin is preferably used for checking the property whether a number represents a prime number.

BRIEF DESCRIPTION OF THE DRAWINGS

18 An exemplary embodiment of the invention is shown in the Figures and is subsequently explained in greater detail.

DESCRIPTION OF THE PREFERRED EMBODIMENTS

Figure 2:
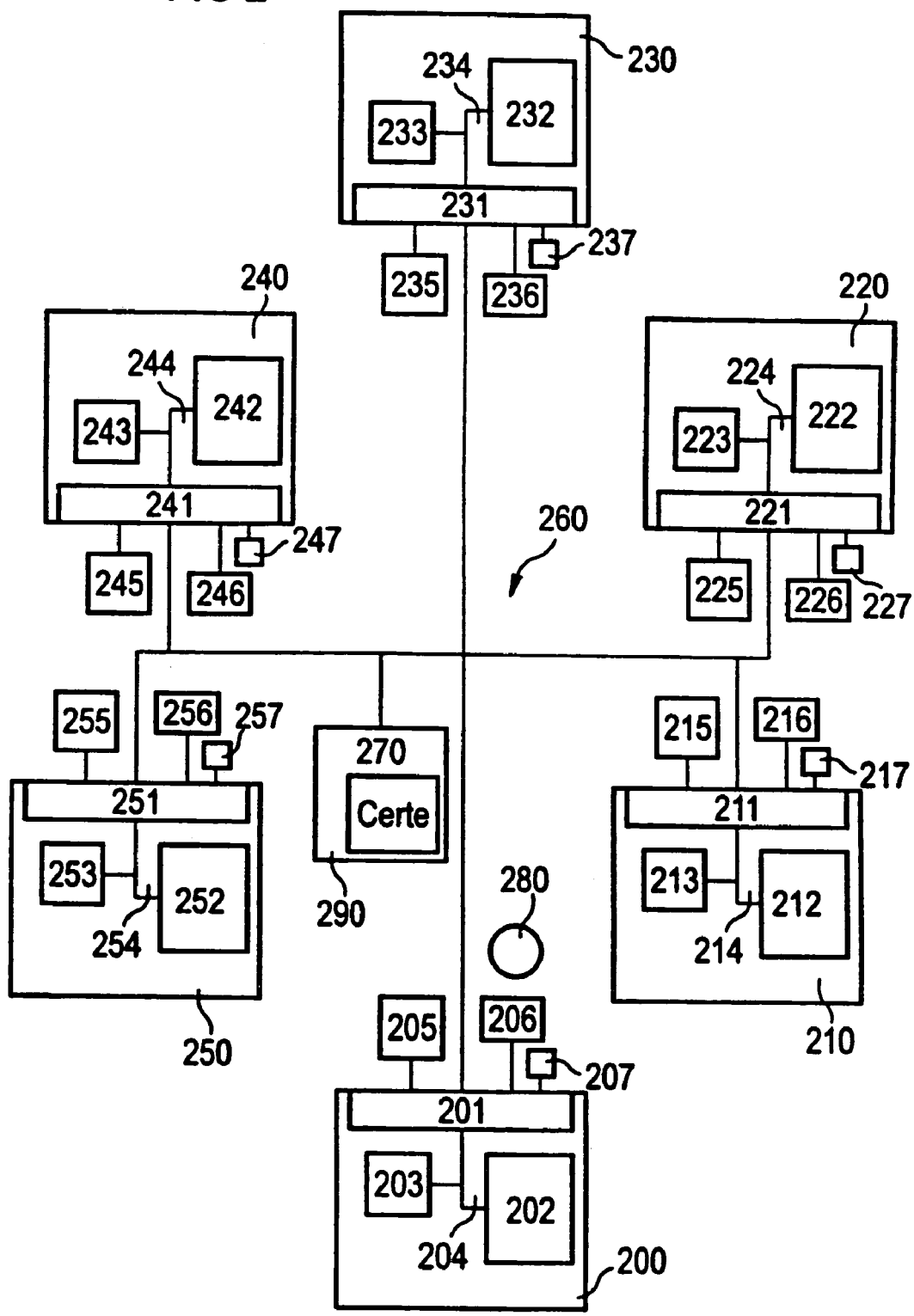
FIG. 2 is a block diagram representing a computer network having a plurality of computers coupled to one another.

FIG. 2 shows a plurality of computers 200, 210, 220, 230, 240, 250, which are connected to one another via a communication network 260. Each computer 200, 210, 220, 230, 240, 250 respectively has a plurality of input devices, i.e., a keyboard 206, 216, 226, 236, 246, 256, a mouse 207, 217, 227, 237, 247, 257, a scanner (not shown) or a camera (not shown). The entered information is supplied to a memory 202, 212, 222, 232, 242, 252 via the respective input device via an input interface/output interface 201, 211, 221, 231, 241, 251 and is stored. The 202, 2212, 222, 232, 242, 252 memory is connected to the input interface/output interface 201, 211, 221, 231, 241, 251 via a bus 204, 214, 224, 234, 254. A processor 203, 213, 223, 233, 243, 253, which is set up such that the following methods steps can be carried out, is also connected to the bus 204, 214, 224, 234, 254.

The computer 200, 210, 220, 230, 240, 250 communicate via the communication network 260 according to the Transport Control Protocol/Internet Protocol (TCP/IP). The communication network 260 also contains a certification unit 270 with which a certificate is prepared respectively for a public key, so that the public key is trustworthy for a communication on the basis of the "Public-Key-Technology". A user 280 enters an arbitrary prescribable word (PIN, password), which is only known to the user, into a first computer 200 (step 101, compare FIG. 1).

Figure 3:
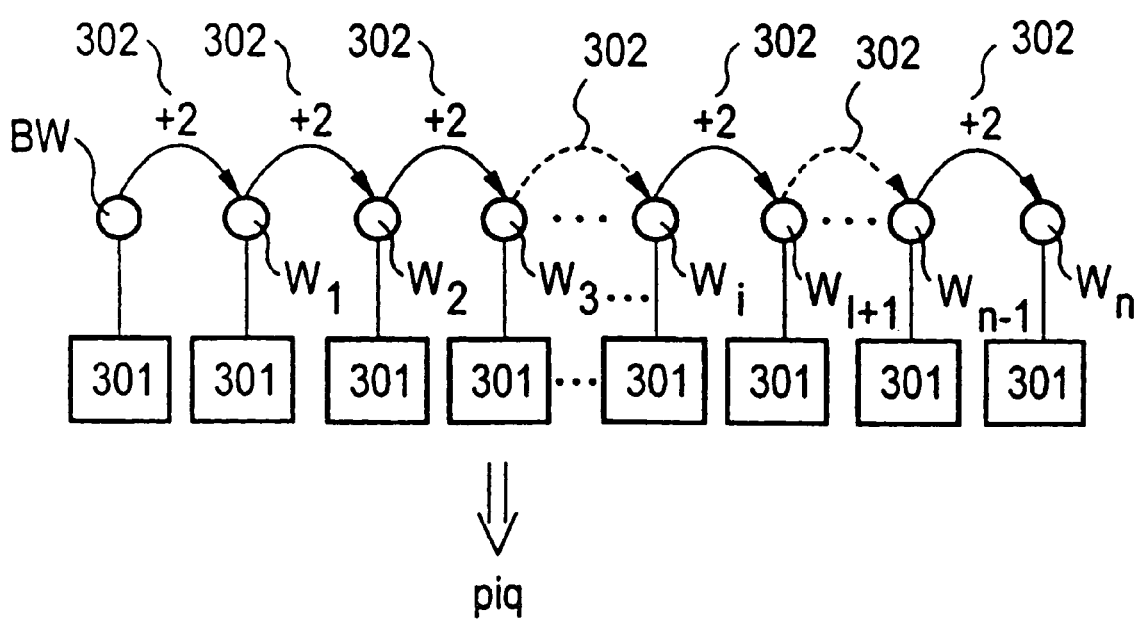
FIG. 3 is a symbolic block drawing representing the course of action for determining a prime number on the basis of an initial value.

According to the RSA method, the first computer 200 generates an asymmetric cryptographic key pair, as described in the following. The value 102 entered by the user 280 and additional data 103 characterizing the user 280, such as user name, personal number, terminal address etc., are supplied to a hash function (step 104). The hash function is defined and has properties as described above. The value formed by the hash function is used as a base value BW for forming two prime numbers, as symbolically shown in FIG. 3. As shown in FIG. 3, it is respectively checked for a value Wi (i=1, . . . , n) in an iterative method, on the basis of the base value BW, whether or not the respective value represents a prime number (step 301).

The method according to Miller-Rabin is utilized as method for checking the property prime for a number (see Menezes). If the number is determined to not be prime, the number is increased by a prescribable value, preferably by the value 2 (step 302) and the test with respect to the property "prime" is repeated (step 301). This course of action is repeated until two prime numbers—a first prime number p and a second prime number q—have been determined.

A number, referred to as an index, indicates how often—on the basis of the base value BW—the number must be increased by the prescribed value until the first prime number p or the second prime number q is obtained. The result of the method shown in FIG. 3 is two prime numbers p and q, which are used for the key generation according to the RSA method (step 105). The prime numbers p and q normally have a length of a multiple of 100 bits. A modulus n is formed from the prime numbers p and q according to the following rule:

$$n = p * q. \tag{1}$$

Furthermore, an intermediate variable (p (n) is formed according to the following rule:

$$\phi(n)=(p-1)*(q-1). \quad (2)$$

A secret key d is now selected such that the secret key d is relatively prime with respect to φ(n). A public key e is determined such that the following rule is fulfilled:

$$e*d \bmod \phi(n)=1. \quad (3)$$

The value d is the private key and is not allowed to be made known to a third party. A private key d (step 106) and a public key e (step 107) have been formed as a result of the key generation (key 105). The two keys d, e form a cryptographic key pair corresponding to one another, this key pair being used for an arbitrary cryptographic operation, i.e., for enciphering, deciphering, for a digital signature, or for authenticating (step 108).

After the key pair d, e has been formed according to the above-described method, the private key d is erased. The public key e is supplied to the certification entity 280. A certificate Certe is formed by the certification entity 280 via the public key e and the certificate Certe of the public key e is stored in a directory 290 that can be accessed by the public. Therefore, each communication participant in the communication network 280 can access the public key e via the certificate Certe of the public key e. The secrete key d corresponding to the public key e is erased in the first computer 200.

Every time that the user 280 wishes to initial a communication on the basis of the key pair or when the user 280 wishes to carry out a cryptographic operation upon utilization of such a key pair, the user 280 enters his initial value (PIN, password) into the first computer 200 and the initial value 102 (as described above), in turn, is provided with additional data 103. It is then subjected to a hash function (step 104) and, on the basis of the base value BW, two prime numbers p and q are determined or a stored index (as described above) is read out or is also entered by the user 280 and a secret communication key is formed from it, which, however, corresponds to the private previously formed key d, which has been erased again.

In this way, a communication key pair has been formed, which comprises the secret communication key and the corresponding public key e. For a communication session, a user can thus respectively immediately generate the secret communication code, so that it is possible to use intense "Public-Key-Technology" without having to store the secret key on a chip card. The generated communication key pair d, e is used for enciphering plaintext 109 with the public key e and for deciphering the electronic, enciphered data 110 with the secret communication key.

Figure 1:
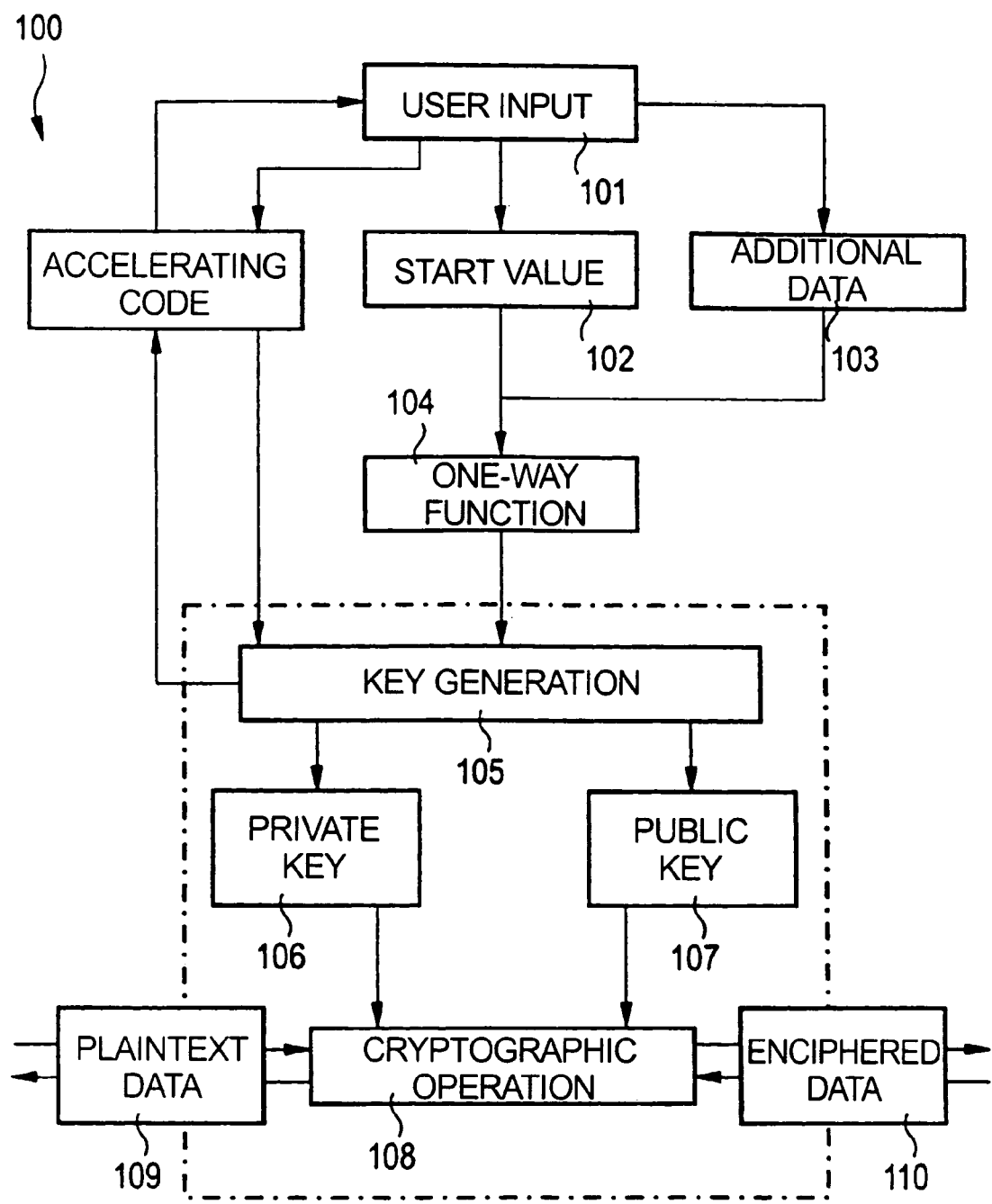
FIG. 1 is a flow diagram representing the method steps of the exemplary embodiment.

FIG. 1 symbolically shows the processing of plaintext 109, i.e., electronic data 109 that can be read by everybody, as well as enciphered electronic data 110, where the communication device is respectively described by an arrow toward or from the block representing a cryptographic operation 108.

The enciphering or, respectively, deciphering is performed according to the following rules:

$$m^e \bmod n=c, \quad (4)$$

where m refers to a quantity of 512 bit of electronic data 109 to be enciphered, c refers to enciphered electronic data 110.

The deciphering of the enciphered electronic data c is performed according to the following rule:

$$m=c^d \bmod n. \quad (5)$$

A few alternatives of the above-described exemplary embodiment are explained as follows. The method can be used for enciphering, for securing integrity and for a digital signature of electronic data. Furthermore, the invention can be utilized in the field of secure electronic mail systems. The user must not necessarily enter the initial value 102 during the generation of the key pair at the beginning of the method, but a central unit generating the key pair can prescribe it to the user. Therefore, the user must merely remember a password or a PIN, and it is no longer necessary to securely store a secret cryptographic key, for example, on a chip card, which is associated with corresponding risks and with considerable outlay. Instead of a hash function, any arbitrary one-way function can be used in the framework of the invention.

The above-described method and arrangement are illustrative of the principles of the present invention. Numerous modifications and adaptations will be readily apparent to those skilled in this art without departing from the spirit and scope of the present invention.

The invention claimed is:

1. A method for producing a regenerated private key by a computer for a predetermined asymmetric cryptographic key pair which includes an original private key and a corresponding public key, the regenerated private key being identical to the original private key, the original private key and the public key having been generated by receiving a predetermined initial value entered by a user; processing the predetermined initial value to obtain a base value for obtaining first and second prime numbers; checking whether the base value is a prime number and, when the base value is not a prime number, increasing the base value by a predetermined increment to obtain a new value; repeating the step of checking until the first and second prime numbers are obtained; storing an index to obtain a stored index, the stored index being a number indicating how many times, in the step of checking, the base value has been increased until the first prime number or the second prime number are obtained; calculating the original private key using the first and second prime numbers; and calculating the public key using the original private key and the first and second prime numbers, the method comprising:

receiving a user input of the predetermined initial value by the computer;

processing the predetermined initial value to obtain a base value for obtaining the first and second prime numbers;

increasing the base value by a value determined by the index previously stored and the predetermined increment to obtain the first and second prime numbers; and producing the regenerated private key using the first and second prime numbers.

2. The method according to claim 1, wherein, in the process of obtaining the original private key, the predetermined initial value is supplied to a hash function to obtain the base value; and wherein, in the process of obtaining the regenerated private key, the same hash function is used.

3. The method according to claim 1,
wherein, in the process of obtaining the original private key, the predetermined initial value is supplied to a hash function to obtain the bass value, and
wherein, in the process of obtaining the regenerated private key, the same hash function is used in the step of processing the, and
the respective values formed by the hash function are used in the determination of both an original key pair and a regenerated key pair.

4. The method according to claim 1, wherein, in the process of generating the original private key and the public key, the method of Miller-Rabin is used to check whether the base value is a prime number.

5. The method according to claim 1,
wherein the asymmetric cryptographic key pair is formed according to the RSA method.

6. The method according to claim 2, wherein the hash function is one of the following methods:
MD-5 method,
the MD-2 method, and
method according to the data encryption standard (DES) as a one-way function.

7. The method according to claim 1, further comprising the following:
using the regenerated private key for encryption electronic data.

8. The method according to claim 1, further comprising:
using the regenerated private key for forming a digital signature.

9. The method according to claim 1, further comprising the following step:
using the regenerated private key for an authentication.

10. A system to form a regenerated private key for a predetermined asymmetric cryptographic key pair, which includes an original private key and a corresponding public key, the regenerated private key being identical to the original private key, the original private key and the public key having been generated by receiving a predetermined initial value entered by a user; processing the predetermined initial value to obtain a base value for obtaining first and second prime numbers; checking whether the base value is a prime number and, when the base value is not a prime number, increasing the base value by a predetermined increment to obtain a new value; repeating the step of checking until the first and second prime numbers are obtained; storing an index to obtain a stored index, the stored index being a number indicating how many times, in the step of checking, the base value has been increased until the first prime number or the second prime number are obtained; calculating the original private key using the first and second prime numbers; and calculating the public key using the original private key and the first and second prime numbers, the system comprising;
an input device to receive a user input of the predetermined initial value;
a processor to process the predetermined initial value to obtain the base value for obtaining the first and second prime numbers, to increase the base value by a value determined by the stored index and the predetermined increment to obtain the first prime number or the second prime number; and to produce the regenerated private key using the first prime number and the second prime number.

11. A method implemented by a computer for generating an asymmetric cryptographic key pair having a public key and a private key, comprising:
receiving a predetermined initial value entered by a user,
processing the predetermined initial value to obtain a base value for obtaining first and second prime numbers;
checking whether the base value is a prime number and, when the base value is not a prime number, increasing the base value by a predetermined increment to obtain a new value;
repeating the step of checking, until the first and second prime numbers are obtained,
storing an index to be used for regenerating the private key when the private key is erased, the index indicating how many times, in the step of checking, the base value has been increased until the first prime number or the second prime number is obtained;
producing the private key using the first prime number and the second prime number;
producing the public key using the private key, the first prime number and the second prime number, and erasing the private key.

12. A method in accordance with claim 11, wherein
the private key is used in a cryptographic operation, and
erasing is performed after using the private key in the cryptographic operation.

13. An apparatus for generating an asymmetric cryptographic key pair having a public key and a private key, comprising:
means for receiving a predetermined initial value entered by a user;
means for processing the predetermined initial value to obtain a base value for obtaining first and second prime numbers;
means for checking, whether the base value is a prime number and, when the base value is not a prime number, increasing the base value by a predetermined increment to obtain a new value;
means for repeating the step of checking, until the first and second prime numbers are obtained;
means for storing an index to be used for regenerating the private key when the private key is erased, the index indicating how many times, in the step of checking, the base value has been increased until the first prime number or the second prime number is obtained;
means for producing the private key using the first prime number and the second prime number;
means for producing the public key using the private key, the first prime number and the second prime number, and
means for erasing the private key.

* * * * *